United States Patent [19]
Ward et al.

[11] Patent Number: 4,739,329
[45] Date of Patent: Apr. 19, 1988

[54] SCALER SCORING SYSTEM

[75] Inventors: Richard L. Ward, Phoenix; Keith A. Olds, Mesa, both of Ariz.

[73] Assignee: Motorola, Inc., Schaumberg, Ill.

[21] Appl. No.: 852,868

[22] Filed: Apr. 16, 1986

[51] Int. Cl.⁴ .............................................. G01S 13/08
[52] U.S. Cl. ..................................... 342/119; 342/58; 342/192; 364/423
[58] Field of Search ................. 342/58, 119, 192, 193, 342/195–197; 364/423

[56] References Cited

U.S. PATENT DOCUMENTS

| | | | |
|---|---|---|---|
| 2,921,301 | 1/1960 | Cartwright | 342/58 |
| 2,992,422 | 7/1961 | Hayes, Jr. | 342/119 |
| 3,034,115 | 5/1962 | Grantham et al. | 342/119 |
| 3,095,564 | 6/1963 | Cartwright | 342/58 |
| 3,168,735 | 2/1965 | Cartwright | 342/58 |
| 3,174,148 | 3/1965 | Cartwright | 342/119 |
| 3,256,519 | 6/1966 | Dewey et al. | 342/119 |
| 3,344,422 | 9/1967 | Holst | 342/119 |
| 3,350,712 | 10/1967 | Stine et al. | 342/58 |
| 3,353,179 | 11/1967 | Cartwright | 342/119 |
| 3,550,125 | 12/1970 | Fierston et al. | 342/195 |
| 3,611,373 | 10/1971 | Cartwright | 342/134 |
| 3,964,695 | 6/1976 | Harris | 364/423 X |
| 4,057,708 | 11/1977 | Greeley et al. | 342/119 X |
| 4,568,938 | 2/1986 | Ubriaco | 342/196 X |

FOREIGN PATENT DOCUMENTS 1571379 7/1980 United Kingdom ................ 342/119

OTHER PUBLICATIONS

A. Przedpelski, "CW Radars Find New Uses in the 80's"; *Microwaves*, (4/82; pp. 89–94).
W. Bell et al., "Low-Cost Technique Provides Accurate Miss-Distance Indicating"; *M. S. N. & C. T.*, (2/85; pp. 62–72).

*Primary Examiner*—Theodore M. Blum
*Assistant Examiner*—Bernarr Earl Gregory
*Attorney, Agent, or Firm*—Maurice J. Jones, Jr.; Eugene A. Parsons

[57] ABSTRACT

A radar transceiver and communications transmitter mounted on a target for communicating video signals from the radar to a remote receiver which has associated therewith an FFT detector for detecting scoring encounters, and a computer or microprocessor which first analyzes the video signals to provide signals indicative of the Doppler frequency shift at a plurality of different times through the use of autoregressive spectral estimation and then computes a model projectile flight pattern, including miss distance and closing velocity, which flight pattern fits the computed Doppler frequency shifts at the plurality of different times.

14 Claims, 2 Drawing Sheets

POINT OF CLOSEST APPROACH

SCALER SCORING SYSTEM

BACKGROUND OF THE INVENTION

The present invention pertains to a scaler scoring system for determining the miss distance of a projectile from a target, such as a remotely operated drone. The scaler scoring system is a training and weapons evaluation tool which must operate not only in the presence of thermal noise, but must also deal with problems such as sea clutter, interfering signals, target generated noise, partial antenna blockage, and complex projectiles with multiple scatterers. In addition, the scoring system must accommodate an extremely diverse set of scoring encounters, including a great number of different projectiles, a large scoring volume and a wide range of relative velocities.

Detecting a scoring encounter reliably in a clutter and noise contaminated environment without also generating extraneous data due to false alarms is a difficult problem and has major impact on scoring accuracy. This is a result of the fact that the accuracy of any computational algorithm is only as good as the input data provided. Many scoring algorithms, especially those that depend on least squares polynominal approximation, are seriously degraded by extraneous data points such as those introduced by radar false alarms. Experience has shown that the inaccuracies introduced by these false data points far outweigh the inaccuracies introduced by missing some of the available data. Even if accuracy is not lost due to false detections, valuable processing time is wasted in the scoring computer when false scores are detected and processed. These false detections interfere with processing real scores in a timely manner and lead to confusion as to which score reports are valid.

SUMMARY OF THE INVENTION

The present invention pertains to an improved scaler scoring system for indicating the miss distance of a projectile from a target, said system including a radar transceiver mounted on the target for providing a video signal and a communications transmitter mounted on the target for communicating the video signal to a remote receiver. The receiver has associated therewith a detector for determining when a scoring encounter has occurred and a computer or microprocessor for analyzing the video signal and providing signals indicative of the Doppler frequency shift at a plurality of different times and for computing a model projectile flight pattern which would produce substantially similar Doppler frequency shifts at approximately the same plurality of different times. In the preferred embodiment the Doppler frequency shifts at the plurality of different times are computed by autoregressive spectral estimation and the model projectile flight pattern is initially computed in accordance with the conjugate gradient algorithm and completed in accordance with the Powell algorithm.

It is an object of the present invention to provide a new and improved scaler scoring system.

It is a further object of the present invention to provide a new and improved scaler scoring system utilizing autoregressive spectral estimation to compute the Doppler frequency shift at a plurality of different times.

It is a further object of the present invention to provide an improved scaler scoring system utilizing the conjugate gradient and Powell algorithms to compute a model projectile flight pattern.

It is a further object of the present invention to provide a new and improved scaler scoring system utilizing improved methods and apparatus for detecting a scoring encounter.

These and other objects of this invention will become apparent to those skilled in the art upon consideration of the accompanying specification, claims and drawings.

BRIEF DESCRIPTION OF THE DRAWINGS

Referring to the drawings.

DESCRIPTION OF THE PREFERRED EMBODIMENT

Figure 1A:
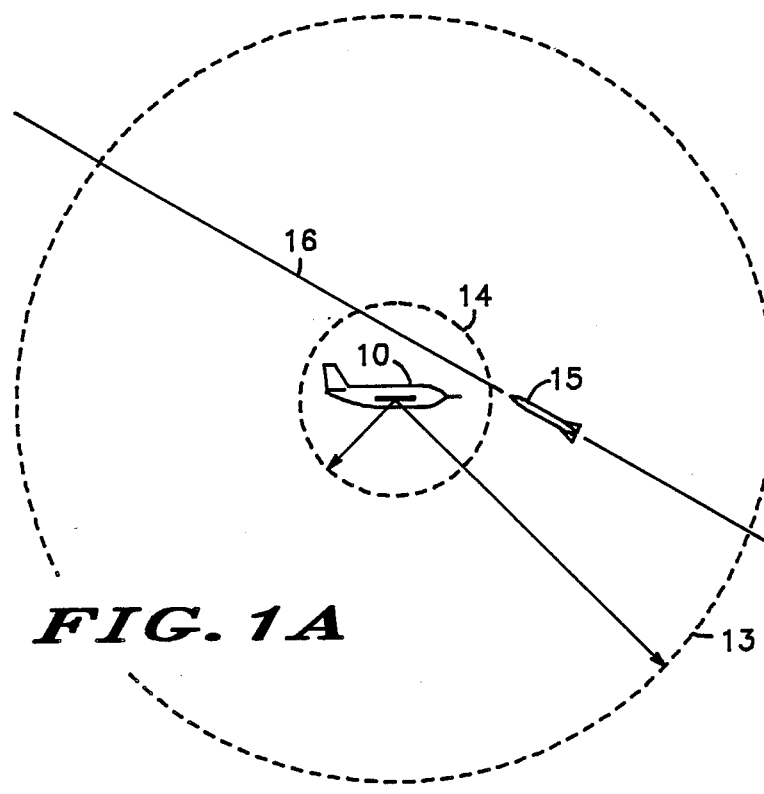
FIGS. 1A, 1B, and 1C illustrate a scoring scenario, an ideal analog Doppler signal, and an ideal Doppler profile, respectively.

FIG. 1A illustrates a scoring scenario including a target 10, which in this example is a remotely operated drone, and a projectile 15. With a Doppler radar sensor 12 (see FIG. 2) located onboard target 10 a spherically shaped outermost scoring envelope 13 and an innermost spherically shaped insensitive zone 14 can be established. Generally, the scoring system will be required to score projectiles/target vehicle encounters up to some predetermined range, for example, 0 to 75 feet and within some range of relative closing velocities, for example, 200 to 8,000 feet per second. In order to accurately score an encounter whose miss distance is 75 feet, the scoring system must be able to see the projectile at a range greater than 75 feet. In order to reduce potential problems, such as additional targets, clutter, too much data, etc., Doppler radar sensor 12 is constructed with a range cutoff as near as possible to the maximum required miss distance, 75 feet in this example. The range cutoff is scoring envelope 13.

Figure 1B:
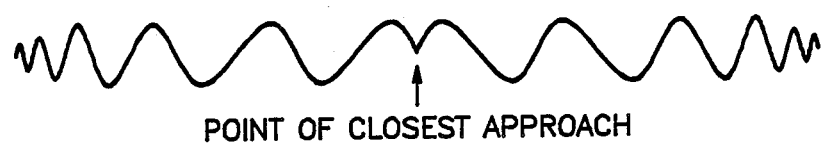
Figure 1C:
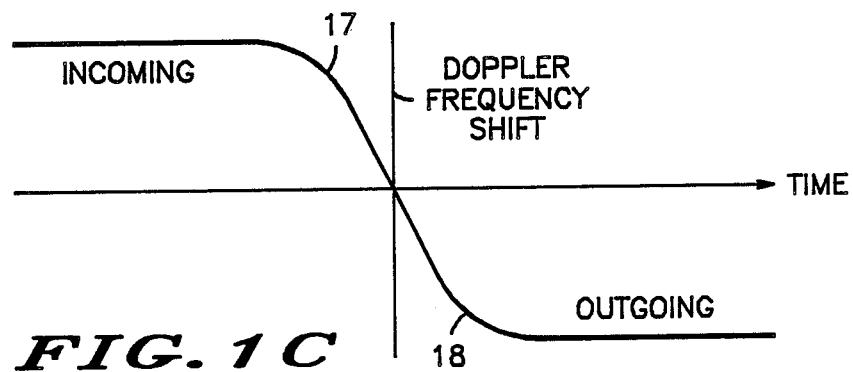

As projectile 15 follows a trajectory 16 through scoring envelope 13 a Doppler frequency shift occurs in Doppler radar sensor 12, an ideal analog representation of which is illustrated in FIG. 1B. Here it should be noted that the Doppler frequency shift approaches 0 as projectile 15 approaches the point of minimum miss distance and then begins to increase in the opposite direction as the projectile passes the point of minimum miss distance. An ideal Doppler profile of the frequency shift is illustrated in FIG. 1C. It should be noted that every trajectory of projectile 15 has a different Doppler profile. Thus, any specific Doppler profile completely defines the trajectory of projectile 15. Further, insensitive zone 14 occurs because Doppler shift measurements become very erratic in the area where the Doppler shift is very small. To accurately define the unique Doppler profile it is essential that at least a portion of a knee 17 or 18 of the Doppler profile curve must be within scoring envelope 13. In the above example, if projectile 15 is traveling at 8,000 feet per second with a miss distance of 75 feet, scoring envelope 13 must have a minimum radius of 120 feet. Scoring envelope 13 can be provided through the use of range gates or the like, all of which are well known to those skilled in the art and will not be elaborated upon herein.

Figure 2:
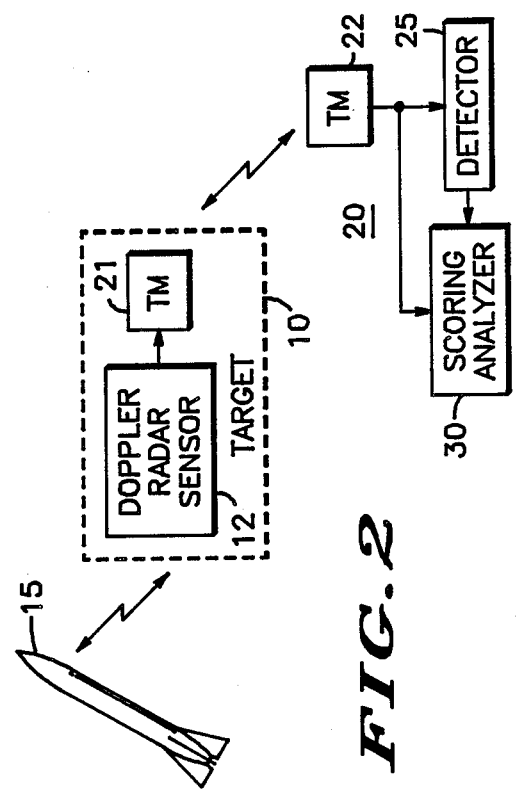
FIG. 2 is a simplified block diagram of a scaler scoring system embodying the present invention.

Referring specifically to FIG. 2, a simplified block diagram of a scoring system embodying the present invention is illustrated. Target 10 includes Doppler radar sensor 12 mounted onboard and in communication with a telemetry system for communicating measured data to a remote site 20. The telemetry system includes at least a transmitter 21 mounted onboard target 10 and in communication with Doppler radar sensor 12, and a remotely located receiver 22 for receiving data transmitted from transmitter 21. It will of course be understood by those skilled in the art that transmitter 21 might have a receiver associated therewith for receiving command signals from a transmitter associated with receiver 22. However, since these are not essential to an understanding of the present invention no further description will be included herein.

Remote site 20 also includes a detector 25 for detecting the occurrence of a scoring event and a scoring analyzer 30 for processing data from telemetry receiver 22 when detector 25 indicates that a scoring event has occurred. In this embodiment detector 25 processes data from receiver 22 in real time so that Doppler radar sensor 12 can be constructed as simply as possible. Sensor 12 simply supplies all video signals to transmitter 21 for communication to receiver 22. Further, in the present system radar in phase and quadrature video pulses are digitized to four bits (16 levels) before being transmitted by transmitter 21 to remote site 20. It will of course be understood that a single phase of video pulses might be transmitted to remote site 20 in analog form and digitized after reception.

Figure 4:
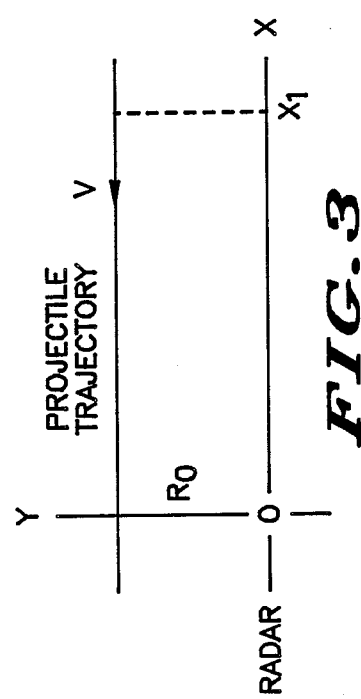
FIG. 4 is a block diagram/flow chart illustrating in more detail a portion of the apparatus of FIG. 2.

After the data is recovered by receiver 22, it is processed in a 128 complex point fast Fourier transform (FET) with a hamming window. This process effectively acts as a Doppler filter bank, each with a 781 Hz bandwidth. FET analyzer and filter 24 are illustrated in FIG. 4 connected between the digital data input from receiver 22 and the input to detector 25. The digital data is also supplied from the data input to the input of a storage unit 32 in scoring analyzer 30. A detect signal from detector 25 is supplied to storage unit 32. In actual operation the digital data is supplied to a buffer prior to storage unit 32 and the same data is processed in FET and filter 24 and in detector 25. If detector 25 provides a detect signal to storage unit 32 the data is moved from the buffer into storage unit 32 for further processing.

Correlated noise signals in the digital data are processed in FET and filter 24 as follows. The output contained in each Doppler filter (FET bin) is compared to a detection threshold and is applied to a feedback loop which nulls the output of each bin with a one minute time constant. The nulling loop provides constant false alarm performance by cancelling any long term correlated noise signals such as those generated by clutter or jet engine modulation. Score signals are not affected by the feedback loop because they only exist for a short time. (The longest specified scoring encounter lasts less than one second). Although the constant false alarm rate (CFAR) action degrades the detection sensitivity in any Doppler bin that contains correlated noise, the overall score detection sensitivity is only marginally degraded because the Doppler frequency does not remain in any bin for more than a few FET frames.

Discrimination between noise detections (false alarms) and score detections in the FET bins is accomplished by taking advantage of prior knowledge about the behavior of score Doppler. If a detection results from a score, the next detection should fall within the same Doppler bin or in a nearby bin with a lower frequency. Since the nulling loops prevent detections on correlated noise, noise detections occur independently in any Doppler bin with equal probability. Thus, scores can be discriminated from false alarms simply by requiring that successive detections fall within a limited Doppler window determined by the maximum specified Doppler rate of change. As each detection occurs, the Doppler window is shifted to track the score Doppler. In order to allow for signal drop outs due to such effects as antenna blockage, multiple scatterer interference from target or sensor dead zone 14, the score detection decision is based on a particular number of detections in a detection window consisting of a larger number of frames.

As is well known to those skilled in the art, a Neyman-Pearson criteria is utilized in most radar detection systems. In a test of this kind, the detection threshold is set to provide a particular probability of false alarm on noise and the probability of detection is found as a function of the signal-to-noise ratio (Whalen, A. D., *Detection of Signals in Noise*, Academic Press, Orlando, Fla., 1971). The detection algorithm for the present scoring system begins with a Neyman-Pearson test but modifies the results based on the knowledge of score encounter behavior.

In order to distinguish between score detections and false alarms, the detection algorithm requires that four detections occur in nine sequential FFT frames. In addition, the system requires that each sequential detection fall within the 10 next lower FFT frequency bins.

The 10 bin frequency window was selected by considering the possible score geometries. The Doppler frequency shift during a score encounter is a monotonically decreasing function of time starting with a positive frequency at nearly the Doppler that would occur if projectile 15 was on a radial (direct hit) trajectory, dropping to zero at the point of closest approach and continuing to a negative frequency with the same absolute value as the initial positive Doppler. Except for extremely near misses at high velocities, and then only in the immediate vicinity of the point of closest approach, the Doppler shift will not change more than 10 bins (7813 Hz) in five FFT frames. Thus, any two detections that show a larger shift than this are false alarms. For the special case of a high speed, near miss encounter, sufficient opportunities where the 10 bin shift limit will not be exceeded are available to allow detection.

The nine frame detection window was selected based on the worst case observation time from a 75 foot miss encounter with a 8,000 foot per second projectile. This encounter provides 18 FFT frames giving two opportunities for detection. It will of course be understood by those skilled in the art that different numbers of frames and bins may be utilized for different applications and the present numbers are utilized only for purposes of explanation. Further, detector 25 may be actually implemented utilizing threshold detectors and shift registers similar to that described in U.S. Pat. No. 4,119,966, entitled "Clutter Discriminating Apparatus for Use with Pulsed Doppler Radar Systems and the Like", issued Oct. 10, 1978, or may be programmed into a microprocessor or the like.

With a scoring encounter detected, the video signal containing the scoring encounter is stored in storage unit 32 for further processing by scoring analyzer 30. In this specific embodiment scoring analyzer 30 is a microprocessor with all of the process steps, to be explained, programmed therein. Storage unit 32 may be a storage unit on the processor chip or may be additional storage external of the chip. Scoring analyzer 30 estimates projectile miss distance, closing velocity between projectile 15 and target 10, and the time of closest approach as well as other related velocities and times, if desired. The estimates of scoring analyzer 30 are displayed on a score parameter display unit 34.

Figure 3:
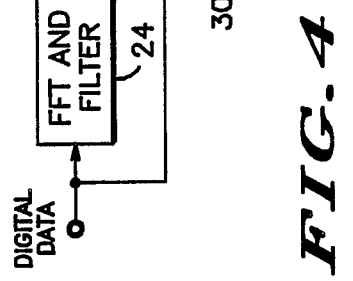
FIG. 3 illustrates a model coordinate system for the apparatus of FIG. 2.

A coordinate system for a point target, flying past a stationary radar with constant velocity, is illustrated in FIG. 3. In FIG. 3, $x_1$ is the X position of the target (projectile 15) at time 0, V is the target velocity (assumed to be parallel to the X axis), and $R_0$ is the Y axis intercept of the velocity vector. It can be shown that the radar Doppler frequency as a function of time is given by:

$$f_d(t) = \frac{2V(X_1 - Vt)}{\lambda [(X_1 - Vt)^2 + R_0^2]^{\frac{1}{2}}} \quad (1)$$

Where $\lambda$ is the RF wave length of the transmitted radar signal. If both the radar and its target are moving (as in the present situation), the same equation may be written for the Doppler frequency if the coordinate system is allowed to rotate so that the situation is that depicted in FIG. 3. In the present scoring system the scaler scoring algorithms utilized in scoring analyzer 30 are based on the idea of fitting equation 1 to a measured Doppler frequency versus time record in such a way as to minimize the square of the error between the model and the record, that is, adjust the parameters $X_1$ V, and $R_o$ to minimize the functional;

$$\sum_{K=1}^{N} \left( F_d(t_K) - \frac{2V(X_1 - Vt_K)}{\lambda [X_1 - Vt_K)^2 + R_0^2]^{\frac{1}{2}}} \right)^2 \quad (2)$$

Here, the Doppler frequency, $F_d(t_k)$, has been assumed to have been measured at discrete points in time to produce a discrete time series. This is a non-linear, multi-variable optimization problem.

Once a section of radar video data has been identified as containing a scoring event, its spectrum will be computed at discrete points in time by a process called "overdetermined rational signal modeling". This recently developed process is especially well suited to the problem of accurately determining the frequencies of sinusoids in white noise and works well even for the cases of short data records (a small number of samples) and negative signal to noise ratios. This spectral analysis technique is based on the fact that if a linear filter is driven by white noise, the power spectral density of the signal at its output is the magnitude squared of frequency response of the filter. If by using a sequence of signal samples as information one can deduce the filter which would have produced the signal in question had it been driven by white noise, then one can deduce the spectrum of the signal by examining the filter. In this context, the filter in question is a digital filter, and the filter is the signal model. That is, the parameters which describe the filter constitute the signal model. Digital filters can be described by a Z transform transfer function. Such a transfer function usually takes the form:

$$T(Z) = \frac{Y(Z)}{E(Z)} = \frac{b_0 + b_1 Z^{-1} + \ldots + b_q Z^{-q}}{1 + a_1 Z^{-1} + \ldots + b_p Z^{-p}} = \frac{B(Z)}{A(Z)} \quad (3)$$

where $Y(Z)$ is the Z transform of the signal sequence (the set of signal samples for which we wish to construct a model), and $E(Z)$ is the Z transform of a white noise sequence. If both the numerator and the denominator of $T(Z)$ are rational polynomials in Z, then the signal model comprised by the transfer function is said to be a rational model. Another way in which a signal model can be expressed is by writing the expression for the signal sample sequence terms. This expression is:

$$y_t + a_1 y_{t-1} + \ldots + a_p y_{t-p} = b_0 E_t + b_1 E_{t-1} + \ldots + b_q E_{t-q} \quad (4)$$

Here, the subscripts t-1, ... t-p, refer to the place the term occupies in the sequence. That is, $y_t$ occurs in the sequence after $y_{t-1}$, which occurs after $y_{t-2}$, etc. A signal model (Z transform transfer function) need not have both a numerator and a denominator. If the denominator is not present, the model is called a moving average model. If the numerator is truncated after $b_o$, the model is called autoregressive. Once the signal model which best represents a sequence of signal samples has been established, the power spectrum of the sequence can be determined by evaluating:

$$T(w) = |T(Z)|^2 \big|_{Z=e^{jw}} \quad (5)$$

where $\omega = 2\pi f$, $0 \leq f \leq 1/2T$, and T is the period at which the signal was sampled. Since this expression can be evaluated at any frequency in the set [0, 1/2T], spectral analysis techniques based on signal modeling offer the potential of much better spectral resolution with a modest number of signal samples than does the Discrete Fourier transform, (D F T).

Obtaining a signal modeling based spectral analysis of a signal from a finite length sequence of samples poses two problems. These are the following:
1. The orders of the polynomials B(Z) and A(Z) in equation (3) must be determined.
2. The polynomial coefficients $b_o, \ldots b_q$ and $a_1, \ldots a_p$ must be determined.

Whether a signal (process) should be modeled as a moving average (MA) process, or an autoregressive (AR) process, or a combination (ARMA) process depends on what its spectrum is expected to look like. A process whose spectrum is expected to be relatively flat should be modeled as a MA process. A process whose spectrum, is expected to be "peaky" as would be expected of sinusoids in white noise, is best modeled as an AR process. For the application here, a signal which is radar Doppler plus white noise is expected. Therefore, an AR model is most appropriate for the present case. If signal modeling spectral analysis to determine Doppler frequency is to be used, the model order (the parameter p in equation (3) and the polynomial coefficients $a_1, \ldots a_p$) must be determined from the signal sample sequence. A procedure has been developed for determining the AR process model coefficients in such a way that the AR model order does not need to be known (Cadzow, "Spectral Estimation: An Overdetermined Rational Model Equation Approach", IEEE Proceedings, Vol. 70, No. 9, September 1982). This procedure is based on the Modified Yule-Walker (MYW) equations. These equations are derived as follows. Consider equation (4) written for an AR process:

$$y_t + a_1 y_{t-1} + \ldots + a_p y_{t-p} = b_0 e_t$$

here, $e_t$ is one element of a zero mean, unit variance, white noise sequence. Multiplying on both sides by $y_{t-q-1}$ and taking expected values on both sides we get:

$$r_{q+1} + a_1 r_{q+1-1} + \ldots + a_p r_{q+1-p} = 0 \quad (6)$$

where the $r_i$ are the autocorrelation lags of the $r_i = E[y_t y_{t-i}]$, $E[\ ]$ denotes expected value. the right hand side of (6) is zero because $y_{t-i}$ and $e_t$ are uncorrelated for each t and i. By multiplying on both sides of (4) by different members of the $y_t$ sequence and taking expected values, one can construct a system of linear, homogenious equations involving the unknown AR model parameters, $a_1 \ldots a_p$. These are the Modified Yule-Walker equations. Written in matrix form, these equations become:

$$Ra = 0$$

where R is a matrix of autocorrelation lags, a is the vector of unknown coefficients and 0 is the zero vector.

$$R = \begin{bmatrix} r_1 r_0 r_{-1} \ldots r_{-p+1} \\ r_2 r_1 r_0 \ldots r_{-p+2} \\ \cdot \\ \cdot \\ \cdot \\ r_t r_{t-1} \ldots r_{t-p+1} \end{bmatrix} \quad (7)$$

Where in the case of real data, $r_{-t} = r_t$, and in the case of complex data, $r^* = r$, where * denotes the complex conjugate.

The use of this matrix equation to determine the unknown AR model coefficients presents two problems. First, the autocorrelation lags are usually not known, since the data usually consists of a time series of signal samples. Second, the appropriate AR signal model order (p) is usually not known. If the data process is assumed to be stationary, the autocorrelation lags can be estimated from:

$$\hat{r}_t = \frac{1}{T-t} \sum_{K=1}^{T-t} \text{ or } y_k y_{k-t} \quad (8)$$

or $$\hat{r}_t = \frac{1}{T} \sum_{K=1}^{T-t} y_k y_{k-t}$$

These are, respectively, the unbiased and biased autocorrelation lag estimates.

If the autocorrelating matrix R were of full rank, its nullity would be zero and the only possible solution for the vector a would be the null vector 0. On the other hand, if the correct dimension of the AR model vector were known, the nullity of R would be one, and the solution vector a would belong to its null space of dimension one. Suppose the question of the correct dimension of the AR model vector a (the model order) were temporarily ignored and the number of components of a taken to be larger than it could possibly be. In this event, the number of components of a would be greater than that needed to model the data time series as the output of an all pole filter driven by white noise.

This implies that in an ideal, noise-free situation, the nullity of the autocorrelation matrix will exceed one by the same number that the model order exceeds the actual requirements. Given this situation, the solution for the vector a will be a linear combination of the vectors belonging to the null space of the matrix R. Consider the singular Value Decomposition (SVD) of R. Let R be an mXn matrix where for our case m≧n. Then, $$R = U \Sigma V^H \quad (9)$$

were U and V are mXn and nXn unitary matrices and $\Sigma$ is a mXn diagonal matrix, with real, positive singular values on its diagonal. Here the subscript H denotes the Hermitian transpose. The number of non-zero singular values is equal to the rank of R. Conversely, the number of zero singular values is equal to the nullity of R. A convenient basis for the null space of R is the set of singular vectors, (the columns of V) corresponding to the zero singular values. Therefore, a solution for the AR model coefficient vector a can be assembled from a normalized sum of the singular vectors of R corresponding to the zero singular values. The normalization is required to make the $a_o$ component of a equal to one.

This concept of choosing an autoregressive signal model order larger than necessary, and determining the actual model order after the fact, is called the Overdetermined Rational Signal Model approach to spectral Analysis.

In real life situations, where the data time series is a collection of samples of signal (usually a sum of sinusoids) plus white noise, the autocorrelation matrix R is almost always found to be of full rank. However, the relative sizes of the singular values R is indicative of the rank (nullity) of the autocorrelation matrix corresponding to the underlying signal process. In this case, it is usually found that a few of the singular values are very much larger than all of the others. These large singular values correspond to the signal subspace of the data whereas the small singular values correspond to the noise subspace. If there are K largest singular values the AR signal model parameter set for the data time series is constructed by forming the normalized sum of the singular vectors corresponding to the N−K smallest singular values. An emperical method for determining the AR model order for a given autocorrelation matrix R is the following:

1. Perform the SVD of R.
2. Arrange the singular values in descending order.
3. Compute the quanties $\sigma_k/\sigma_{K+1}^{3/2}$, K=1, 2, ..., n−1, where the $\sigma$s are the singular values.
4. Choose the value of K corresponding to the largest of these quantities as being the "rank" of R, so that the AR model coefficient vector is constructed by summing the singular vectors corresponding to singular values $\sigma_{k+1} + \ldots + \sigma_n$.

This technique for determining which singular vectors to use in constructing the AR signal model has been shown to work in simulations, although there is no known theoretical basis for it.

The procedure for converting a time series of radar video samples into a set of Doppler frequency versus data points to be used as an input to a model fitting algorithm is as follows:

1. Obtain a set of "windows" of radar video signal samples from the collection of samples which comprise a scoring event. By a "window" is meant some number of time contiguous samples. A window may contain as few as 80 samples, or as many as 250. Windows may be arranged end to end to cover a scoring event, or they can be overlapped, or they can be spaced with gaps in between. Any combination of these window arrangements may be used to cover a scoring event. Which of these options will be used in the scoring system will depend on the time length of the score and information obtained from score detector 25 about the probable encounter duration. Windows containing 128 points arranged end to end will probably suffice for most scoring events.

2. Use the radar video data in the window, taken as time series, to compute an estimated autocorrelation matrix for the window. Here, one must choose both the row and column dimensions of the matrix. The restrictions here are that the number of rows should be greater than or equal to the number of columns and neither should exceed half the number of data points. The number of columns should exceed the maximum number of sinusoids expected in the data by at least a factor of two. The number of rows should be large enough so that at least some autocorrelation lags are very small. The present embodiment utilizes a 60 by 20 matrix with the 128 point windows. This means that the dimension of the autoregressive signal model parameter vector will be 20. Since the autocorrelation matrix is Toeplitz, it suffices to compute only the first column plus the first element of the second column for real data, or the first column plus the first row for the complex data.

3. Compute the Singular Value Decompsition (SVD) of the autocorrelation matrix. The SVD of a matrix is computed by a process of reducing the matrix to diagonal, or tridiagonal by a series of transformations. During the course of this procedure, information is developed which enables the computation of the matrices U and V in equation (9). At the end of procedure, the singular values appear on the diagonal of the matrix. Every real or complex matrix possesses a SVD regardless of its rank. Furthermore, the singular values are always real and greater than or equal to zero. For a real matrix, a series of Householder and Givens transformations are used to reduce the matrix to diagonal form. For a complex matrix, QR transformations are used. The fact that the autocorrelation matrix is Toeplitz can be exploited to reduce the number of computational operation required to compute its SVD.

4. Construct the AR signal model parameter vector by computing the normalized sum of the singular vectors corresponding to the n−p smallest singular values, where the signal model order p is computed as explained above.

$$a = \frac{\sum_{k=p+1}^{n} \overline{V_k(1)} V_k}{\sum_{k=p+1}^{n} |V_k(1)|^2} \quad (10)$$

where a is the model parameter vector $a = [1, a_1 \ldots, a_1]^T$

Here $V_k(1)$ is the first component of $V_{ka}$ and the overbar denotes complex conjugate. Once the vector a is known, the spectrum of the signal represented by the window of radar video samples may be computed at any frequency between zero and half the sampling frequency (100 kHz for the example) by:

$$S(f) = \left| \frac{1}{1 + a_1 Z^{-1} + \ldots + a_n Z^{-n}} \right|^2 \quad (11)$$

where $Z = 2\pi f$

Since this spectrum is expected to be that of a Doppler tone, the frequency at which S(f) is maximum is computed to be reported as the Doppler frequency corresponding to the window of radar video data. The time corresponding to the time at the center of a data window is used to create a Doppler frequency-time data pair. The time associated with the first data window of a scoring event set is set to zero, and the other times are referenced to the time of this window. The time reference is later set to the correct IRIG time for the purpose of computing the time of closest approach. Since some of the projectiles (missiles) are known to be large compared to a radar RF wavelength, these are expected to look like a collection of several point targets to the radar at aspect angles near the point of closest approach. As has been demonstrated by simulation and analysis of actual score data, this can result in a spectrum which has several (2 or 3) distinct peaks. When this occurs, the algorithm which computes the Doppler frequency from S(f) reports a frequency midway between the highest and the lowest frequencies corresponding to peaks of S(f) which are within 6 dB of the highest peak, with peaks occurring at frequencies less than 300 Hz being arbitrarily ignored because they are outside the range of useful Doppler frequencies. This strategy for computing an equivalent Doppler frequency has been shown by simulation to result in adequately accurate estimates of miss distance, etc.

The above four steps (1-4) are repeated for all of the data windows which comprise a scoring event. The resulting Doppler frequency-time pairs are presented to the model fitting minimization algorithm as a data set to be used in computing the parameters $X_1$, V, and $R_o$, which best fit the data.

A number of numerical approaches to solving the problem of computing the parameters $X_1$, V, and $R_o$, which best fit the data have evolved. Wismer & Chattergy, *Introduction to NonLinear Optimization*, North Holland Publishing Co., 1978. Among these are the method of steepest descent (Fletcher-Powell), the Conjugate Gradient algorithm, the Powell algorithm, and search algorithms which do not involve the computation of gradients, such as Razor and Grazer search. For this embodiment the Conjugate Gradient and the Powell algorithms were chosen. These are both quadratically convergent search algorithms which perform one dimensional searches in directions which are orthogonal to the previous search direction. This results in a series of searches along conjugate vectors which results in the minimization of the object function at the end of the search. The Conjugate Gradient algorithm uses knowledge of the object function gradient to determine the next direction of search, whereas the Powell algorithm starts its search in an arbitrary direction and basis its next search direction on the end points of previous searches. Both of these algorithms converge in the minimum possible number of steps if the problem is one dimensional and the object function quadratic. For this application, both of these algorithms were modified to constrain the search to a region of hyperspace bounded by the known upper and lower bounds of the model parameters.

The Conjugate Gradient algorithm is actually constrained twice. That is, once the search direction has been established, the search range in this direction is constrained so that at least one of the model parameters stays inside the previously prescribed hyperspace volume. If at the end of any search step the model parameter vector (state vector) has been taken outside then allowed search volume, the algorithm is essentially started over at a point on the search volume boundary nearest the point where the search step ended. When the algorithm is re-started, its first search step is always in the direction of the gradient. This contraining of the search algorithms greatly increases the rate at which they converge and also prevents them from settling on a local minimum which does not make physical sense. Forcing the Conjugate Gradient algorithm to start over if its search takes it outside the constraint boundaries can cause it to become trapped in a corner of the allowed search volume where it must move outside the volume temporarily to find a path to a smaller object function value inside the search volume. When this occurs, it is easily recognized, and the search volume constraint boundaries can be moved to insure that the algorithm converges.

The Conjugate Gradient algorithm and the Powell algorithm complement each other. The Conjugate Gradient algorithm tends toward convergency rapidly when it is a long way from the solution but becomes very slow as it nears convergence. The Powell algorithm, on the other hand cannot find the solution from a long way away but converges quite rapidly when it is in the neighborhood of the solution. Therefore, the strategy used is to use the Conjugate Gradient algorithm until its convergency rate slows down and then switch to the Powell algorithm for the final convergence. These algorithms share some common software modules. These are the modules which compute the gradient of the object function and one which implements the one dimensional Fibonacci search after the search direction has been established.

Thus, through the spectral estimation technique of autoregressive spectral analysis the actual Doppler frequency shift at a plurality of different times is computed and, through the use of the Conjugate Gradient algorithm and the Powell algorithm, a model projectile flight pattern is computed which best fits the pattern of Doppler frequency shifts at the plurality of different times. The process of fitting a radar point target, constant velocity, Doppler frequency model to the Doppler frequency estimated from the radar video data is at least as accurate as any alternative scheme and is more accurate in the presence of sea clutter, interfering signals, target generated noise, partial antenna blockage, complex projectiles with multiple scatterers, and for signal to noise ratios less than unity. Further, the system is more flexible and efficient than most prior art devices. The airborne sensor is kept as simple and cheap as possible since it is semi-expendable. Thus, an improved scaler scoring system is disclosed which automatically detects a scoring event and then computes substantially any information required, including miss distance, closing velocity and time of closest approach. Further, the scoring system is highly versatile and the times of any important happenings during scoring events or radial distance from the radar to the projectile during the scoring event may be easily computed once the score model geometry has been established for the event.

While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

What is claimed is:

1. An improved scaler scoring system for indicating the miss distance of a projectile from a target, the scoring system comprising:
   a radar transceiver mounted on the target and situated to illuminate the projectile during at least a portion of a fly-by, the illumination providing in the transceiver a video signal including a Doppler frequency shift;
   communication means including at least a transmitter mounted on the target and a remote receiver, said transmitter being coupled to said radar transceiver for receiving the video signal and communicating the video signal to said remote receiver;
   first computing means coupled to said remote receiver for receiving the video signal, for providing signals indicative of the Doppler frequency shift at a plurality of different times during the illumination of the projectile, for providing a plurality of discrete points in time of a frequency spectrum of the video signal by overdetermined rational signal modeling, and for performing the overdetermined rational signal modeling by auto-regressive spectral estimation; and
   second computing means coupled to said first computing means for receiving the signals indicative of the Doppler frequency shift and for computing a model projectile flight pattern, including miss distance and projectile speed, which flight pattern would produce substantially similar Doppler frequency shifts at approximately the same plurality of different times.

2. An improved scaler scoring system as claimed in claim 1 wherein the radar transceiver includes a transmitter and a gated type receiver having a predetermined range cutoff.

3. An improved scaler scoring system as claimed in claim 2 wherein the predetermined range cutoff is greater than a distance required to obtain Doppler frequency shifts at a minimum of ten different times from a projectile flying at a maximum expected speed and a selected maximum miss distance.

4. An improved scaler scoring system as claimed in claim 1 wherein the second computing means is designed to compute at least a portion of the model projectile flight pattern.

5. An improved scaler scoring system as claimed in claim 4 wherein the second computing means is further designed to compute a final portion of the model projectile flight pattern in accordance with a Powell algorithm.

6. An improved scaler scoring system as claimed in claim 4 wherein the second computing means computes at least a portion of the model projectile flight pattern in accordance with a conjugate gradient algorithm.

7. An improved scaler scoring system as claimed in claim 1 including score detection apparatus connected to receive the video signal from the remote receiver and provide a score detection signal, and signal storage means connected to receive the score detection signal and further connected to receive the video signal and store portions thereof containing scoring events in response to the score detection signal, said signal storage means having an output coupled to the first computing means.

8. An improved scaler scoring system as claimed in claim 1 wherein the first and second computing means are included in a microprocessor.

9. An improved scaler scoring system as claimed in claim 8 including an analog to digital converter coupled to the radar transceiver for receiving the video signal and further coupled to supply a digitized video signal to the transmitter of the communication means.

10. An improved scaler scoring method providing an indication of the miss distance of a projectile from a target, said method comprising the steps of:
  transmitting an RF signal from the target so as to illuminate the projectile for at least a portion of a fly-by;
  receiving reflected RF signals from the projectile at the target, which reflected RF signals include a Doppler frequency shift produced by the relative speeds of the target and projectile;
  removing the RF signal from the reflected RF signal to provide a video signal including the Doppler frequency shift;
  transmitting the video signal to a receiver at a remote site;
  utilizing the video signal at the remote site to generate a plurality of signals indicative of the specific Doppler frequency shift at each of a plurality of different times during the illumination of the projectile through the use of overdetermined rational signal modeling techniques which include autoregressive spectral estimation; and
  utilizing the plurality of signals to compute a model projectile flight pattern, including miss distance, which flight pattern would produce substantially similar Doppler shifts at approximately the same plurality of different times.

11. An improved scaler scoring method as claimed in claim 10 wherein the step of utilizing the plurality of signals to compute a model projectile flight pattern includes the use of a conjugate gradient algorithm to determine at least a portion of the flight pattern.

12. An improved scaler scoring method as claimed in claim 11 wherein the step of utilizing the plurality of signals to compute a model projectile flight pattern includes the use of a Powell algorithm to determine a final portion of the model projectile flight pattern.

13. An improved scaler scoring method as claimed in claim 10 including in addition the step of converting the video signal to a digital form before transmitting it to the receiver at the remote site.

14. An improved scaler scoring method as claimed in claim 10 including in addition, prior to the step of utilizing the video signal to generate a plurality of signals, the steps of utilizing Fourier transforms to analyze the video signals in frequency and time, filtering the video signals to remove relatively long term signals, providing a detection indication in response to the analysis indicating a relatively short term signal at a substantially specific frequency, and storing the analyzed video signals in response to the detection indication.

* * * * *